United States Patent
Katoh

(10) Patent No.: US 10,559,051 B2
(45) Date of Patent: Feb. 11, 2020

(54) IMAGE FORGERY PROTECTION APPARATUS

(71) Applicant: Panasonic Intellectual Property Management Co., Ltd., Osaka (JP)

(72) Inventor: Yoshikazu Katoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 15/595,979

(22) Filed: May 16, 2017

(65) Prior Publication Data

US 2017/0345116 A1 Nov. 30, 2017

(30) Foreign Application Priority Data

May 26, 2016 (JP) ................................. 2016-105517

(51) Int. Cl.
*G06T 1/00* (2006.01)
*G06F 21/00* (2013.01)
*G06F 21/64* (2013.01)

(52) U.S. Cl.
CPC .............. *G06T 1/005* (2013.01); *G06F 21/00* (2013.01); *G06F 21/64* (2013.01); *G06T 1/0028* (2013.01); *G06T 2201/0051* (2013.01); *G06T 2201/0052* (2013.01)

(58) Field of Classification Search
None
See application file for complete search history.

(56) References Cited

U.S. PATENT DOCUMENTS

| 2009/0190189 A1 | 7/2009 | Suga |
| 2015/0301802 A1 | 10/2015 | Katoh |
| 2018/0026801 A1* | 1/2018 | Geis ...................... H04L 9/3278 |

FOREIGN PATENT DOCUMENTS

| JP | 2005-094420 | 4/2005 |
| JP | 2006-146962 | 6/2006 |
| JP | 2009-089178 | 4/2009 |
| JP | 2015-212933 | 11/2015 |

OTHER PUBLICATIONS

Cao, Yuan, et al. "CMOS image sensor based physical unclonable function for coherent sensor-level authentication." IEEE Transactions on Circuits and Systems I: Regular Papers 62.11 (2015): 2629-2640.*

(Continued)

*Primary Examiner* — Vu Le
*Assistant Examiner* — Tracy Mangialaschi
(74) *Attorney, Agent, or Firm* — McDermott Will & Emery LLP

(57) ABSTRACT

An image forgery protection apparatus comprises: one or more memories; and circuitry. The circuitry generates challenge data which change with lapse of time at least in a predetermined period. The circuitry generates a unique response which changes with lapse of time, the unique response corresponding to the challenge data on a basis of a physically unclonable function. The circuitry changes subject image data correspondingly to the unique response, the subject image data obtained by capturing an image of a subject.

10 Claims, 13 Drawing Sheets

(56) References Cited

OTHER PUBLICATIONS

Chen, An. "Utilizing the variability of resistive random access memory to implement reconfigurable physical unclonable functions." IEEE Electron Device Letters 36.2 (2015): 138-140.*

Rose, Garrett S., et al. "A write-time based memristive PUF for hardware security applications." Computer-Aided Design (ICCAD), 2013 IEEE/ACM International Conference on. IEEE, 2013. (Year: 2013).*

Potkonjak, Miodrag, Saro Meguerdichian, and Jennifer L. Wong. "Trusted sensors and remote sensing.";Sensors, 2010 IEEE. IEEE, 2010. (Year: 2010).*

Rostami M, Wendt JB, Potkonjak M, Koushanfar F. Quo vadis, PUF?: trends and challenges of emerging physical-disorder based security. In 2014 Design, Automation & Test in Europe Conference & Exhibition (DATE) Mar. 24, 2014 (pp. 1-6). IEEE. (Year: 2014).*

* cited by examiner

FIG. 10

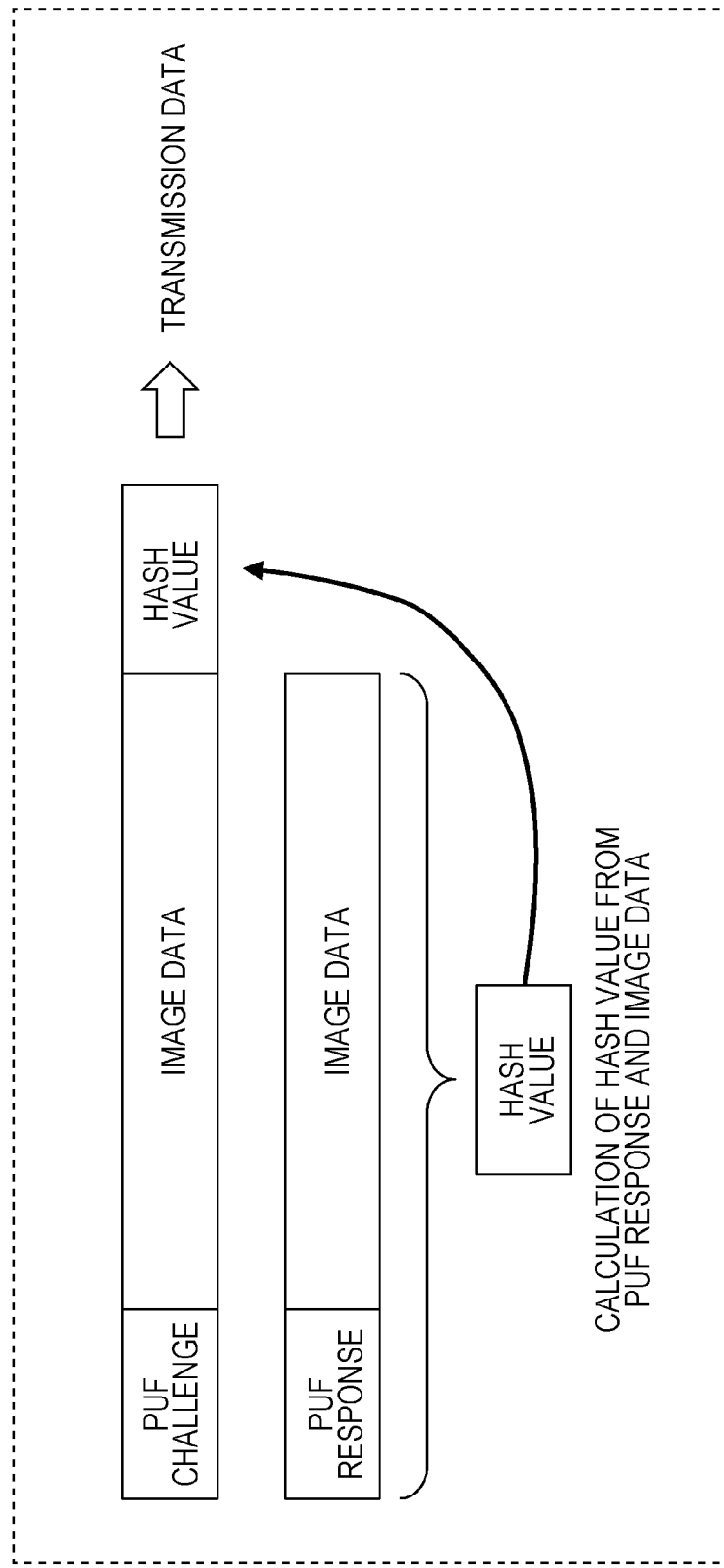

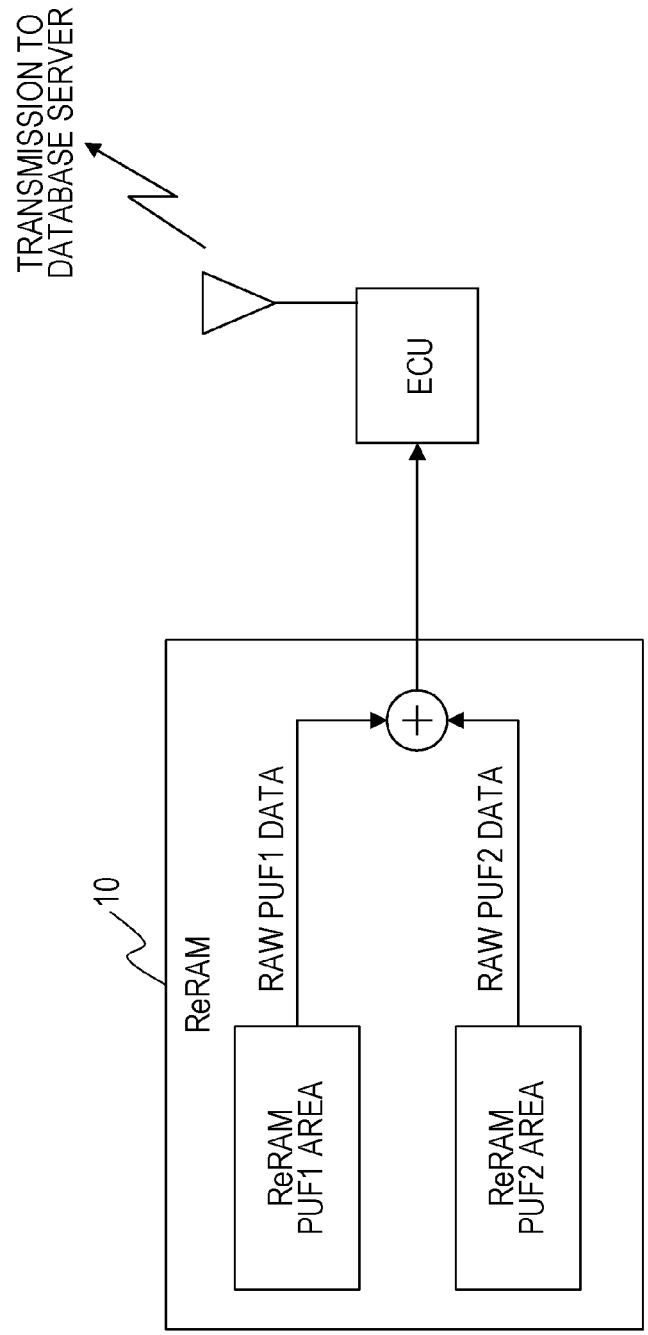

IMAGE FORGERY PROTECTION APPARATUS

BACKGROUND

1. Technical Field

The present disclosure relates to an image forgery protection apparatus that protects image data obtained by capturing an image of a subject against counterfeit and tampering and transmits the data.

2. Description of the Related Art

In related art, some image forgery detection systems are well-known (for instance, Japanese Unexamined Patent Application Publication No. 2006-146962, Japanese Unexamined Patent Application Publication No. 2005-094420).

Japanese Unexamined Patent Application Publication No. 2006-146962 discloses a technique that detects forgery of an image obtained by capturing a vehicle cabin with a camera. As a light emission pattern of a light-emitting diode (LED) light source that illuminates a subject, the technique uses a data pattern which is encoded with a secret key, and extracts encoded information from a pattern of change in the amount of light appearing in the image to verify the coded information.

Also, in the technique of Japanese Unexamined Patent Application Publication No. 2005-094420, both a monitoring camera and a monitoring terminal obtain standard time information. The monitoring camera captures a subject which is to be monitored, and adds the standard time information to a video signal obtained by the capturing, in a vertical blank period of the video signal, then sends the video signal. The monitoring terminal compares the standard time information added to the video signal with the standard time information obtained by the monitoring terminal itself, and checks whether or not the both pieces of information indicate the same time, thereby detecting tampering of the video signal. Japanese Unexamined Patent Application Publication No. 2005-094420 states that a further secured image tampering protection system may be provided by encoding information to be added with a secret key and permitting access to an image by people who have already shared a secret key.

SUMMARY

One non-limiting and exemplary embodiment provides an image forgery protection apparatus that protects image data obtained by capturing an image of a subject against forgery and tampering and transmits the data.

In one general aspect, the techniques disclosed here feature an image forgery protection apparatus including: one or more memories; and circuitry. The circuitry generates challenge data which change with lapse of time at least in a predetermined period. The circuitry generates a unique response which changes with lapse of time, the unique response corresponding to the challenge data on a basis of a physically unclonable function (hereinafter also referred to as PUF). The circuitry changes subject image data correspondingly to the unique response, the subject image data obtained by capturing an image of a subject.

The image forgery protection device according to the present disclosure protects image data obtained by capturing an image of a subject against an image forgery attack caused by leakage of secret information, and transmits the data safely.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a schematic diagram in which the median of a distribution of variation in the resistance value is detected, and the resistance value of each of memory cells is converted to binary data of 0/1 using the median as a threshold;

FIG. 11 is an image diagram illustrating transmission data and calculation process for a hash value; and FIG. 12 is an image diagram illustrating conversion tables for physically unclonable functions.

DETAILED DESCRIPTION

Figure 1:
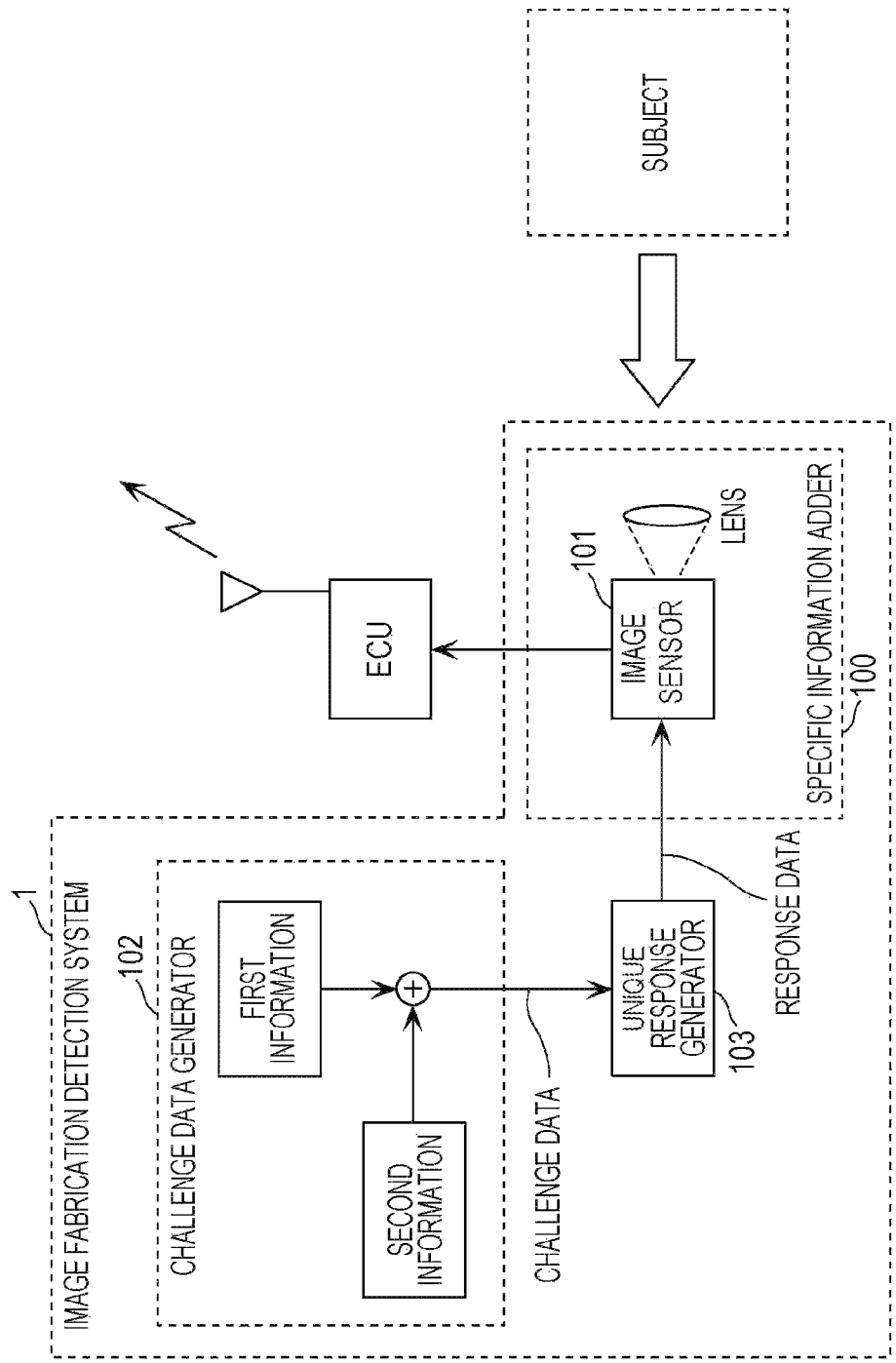
FIG. 1 is a diagram illustrating the entire configuration of an image forgery detection system according to a first embodiment.

Underlying Knowledge Forming Basis of the Present Disclosure

Some conventional image forgery detection systems provide tampering protection and authorized access by adding data, encoded with a secret key, to an image, and capturing LED light emission based on an encoded pattern, by a camera. In short, the data encoded with a secret key plays a key role in security.

Due to advances in encryption technology in recent years, for instance, Triple Data Encryption Standard (3DES) and Advanced Encryption Standard (AES) are being widely used as typical schemes using an encryption circuit. These encryption schemes adopt an advanced encoding algorithm so that even if a pair of a plain text (in other words, pre-encoded data) and an encoded text serving as input/output is obtained and analyzed by making full use of the world's highest speed computer, a secret key cannot be identified within a practical amount of time, and thus the security has been verified. In this manner, encoded data is protected by computational security.

In general, in a process of manufacturing ICs, a secret key is written to each of the ICs in advance in an environment where security is ensured, and the secret key is shared between the ICs in advance. Thus, mutual authentication is made possible between the ICs having a secret key shared in advance, or between a device with the IC mounted and a user. In this manner unauthorized IC and an impersonated user to which a secret key is never known, tampering of data, counterfeit goods are eliminated. For instance, an authenticating side encodes random number data with a secret key, and transmits the encoded data to an authenticated side. The authenticated side decodes the random number data which has been encoded with a secret key shared in advance, restores the original random number data, and sends the random number data back to the authenticating side. The authenticating side verifies the matching of random number data. Consequently, it is ensured that the authenticated side has a secret key, and the authenticating side authenticates the authenticated side as an authorized subject. The same goes with communication of data.

However, even if hacking into encoded data is protected, due to advances in attack technology in recent years, concerns are growing that there is vulnerability to hacking directly to a secret key.

In an IC in a classic scheme, an encryption key is stored in an internal fuse ROM or non-volatile memory. In the former configuration, the state of a fuse element may be observed by X-ray projection, electrical conduction/non-conduction of the fuse element may be analyzed, and thus stored key information may be hacked. In the latter configuration, the state of the fuse element may not be analyzed by X-ray projection. However, key information may be hacked by bringing a probe into direct contact with both ends of a memory element of a non-volatile memory, and electrically reading the state of the element. Thus, IC with enhanced security is manufactured using a leading edge fine process so that a probe is not brought into direct contact with an internal circuit. In other words, threat based on analysis by probing has been avoided by manufacturing the ICs in a fine process with rules for wiring thinner than the diameter of the leading end of a probe produced by the latest technology.

Use of a leading edge process makes analysis by probing and optical observation difficult. However, when a type of IC having a low volume of production is manufactured in a leading edge process, the type of IC has an increased price and reduced product competitiveness. In contrast, when ICs are manufactured in a conventional process with a low production cost, physical tamper resistance reduces. Thus, it is difficult to achieve both of low cost and high security.

These days, a side-channel attack technique has started to be used and is considered to be a threat. The side-channel attack is a technique that identifies a secret key using side-channel information such as the power consumption of a semiconductor device, and radiated electromagnetic waves depending on the power consumption at the time of execution of signal processing circuits. Examples of this technique include Differential Power Analysis (DPA). The reason why the technique poses a threat is that an attacker (that is, a hacker) is able to hack key information during an actual operation of an IC without causing physical damage to the IC. Key information stored in a non-volatile memory is read at a timing triggered by execution of encryption processing. In consideration of the principle of DPA, if data read at a timing similar to the aforementioned timing is identified and obtained, there is a possibility that the content of the data may be analyzed by DPA.

In addition, when the internal specification of an IC is revealed, a method of controlling the IC is understood by hackers, and all data stored in a non-volatile memory including encryption key information is hard-copied as described above, and a copy of the IC is produced.

An incident where a secret key is easily stolen by the latest hacking attack like this has been reported, and it is getting difficult to protect an image from being falsified or fabricated by a conventional technique.

The present disclosure provides an image forgery detection system that protects against an image forgery attack caused by leakage of secret information as well as provides a safety camera monitoring system. It is to be noted that the image forgery detection system is an example of an image forgery protection apparatus.

An image forgery protection apparatus according to an aspect of the present disclosure an image forgery protection apparatus including: one or more memories; and circuitry. The circuitry generates challenge data which change with lapse of time at least in a predetermined period. The circuitry generates a unique response which changes with lapse of time, the unique response corresponding to the challenge data on a basis of a physically unclonable function. The circuitry changes subject image data correspondingly to the unique response, the subject image data obtained by capturing an image of a subject.

Here, the physically unclonable function is a function that is defined based on a manufacturing variation of a physical structure and that has the characteristic that it is extremely difficult to artificially control the manufacturing variation (that is, the function) for each individual structure. Thus, in the above-described configuration, the unique response is individual identification information which is substantially not possible to be physically copied. The subject image data changes correspondingly to the individual identification information, thereby making it possible to detect tampering of the subject image data.

The circuitry may include an image sensor that captures the image of the subject to generate the subject image data, and that adjusts the subject image data by changing a predetermined imaging parameter. The circuitry may change the subject image data correspondingly to the unique response by changing the imaging parameter correspondingly to the unique response.

With this configuration, the specific information can be added to the subject image data using the image sensor which is a basic component, and thus the configuration of the image forgery protection apparatus may be simplified.

The circuitry may include a light emitting element that illuminates the subject. The circuitry may change the subject image data correspondingly to the unique response by changing a light emission pattern of the light emitting element correspondingly to the unique response.

With this configuration, in a system having a light emitting element for illumination, the specific information can be added to the subject image data utilizing the light emitting element. For instance, when the image forgery protection apparatus is applied to a drive recorder, the light emitting element can be mounted as the headlight of a vehicle.

The circuitry may generate a character and adds the character to the subject image data. The circuitry may change the subject image data correspondingly to the unique response by changing the character correspondingly to the unique response.

With this configuration, a portion of the subject image data, which changes correspondingly to a response, is restricted to a portion to which the character is added, and in the rest of the portion, it is possible to obtain the original subject image data, which does not change correspondingly to a response.

The challenge data may be generated by using at least one selected from the group consisting of time information, position information and a random number. The challenge data may be generated further by using at least one selected from a group consisting of individual product information, user specific information and position information on product installation.

With this configuration, using information unique to each piece of subject image data, such as time information, for the challenge data improves the reliability of protection and detection of forgery of the subject image data.

The physically unclonable function may be a function based on a resistance value of a resistance variable element included in a non-volatile resistive memory.

The resistance value of the resistance variable element is based on the number of multiple conductive filament paths present in the resistance variable element and on the variation in the path route. The conductive filament has characteristics such that while electrical stress greater than or equal to a predetermined value is not applied to a conductive filament, the conductive filament maintains the same state, whereas when electrical stress greater than or equal to the predetermined is applied to a conductive filament, the number and paths of conductive filaments are changed at random, and the resistance variation distribution relationship, that is, the physically unclonable function in a non-volatile resistive memory is updated.

Therefore, with the configuration described above, for instance, in recycling of a product, the product can be recycled by changing the physically unclonable function to a completely different one. Also, it is possible to construct a system in which when once used product is discarded, the physically unclonable function which has been used for tampering detection until then may be deleted and discarded safely. Consequently, in recycling and discarding of a apparatus, it is possible to avoid risk such as fraudulent use of a registered old physically unclonable function.

The circuitry may change the physically unclonable function by applying an electrical stress to the non-volatile resistive memory.

With this configuration, it is possible to ensure the above-described recycling of a product and safety in discarding a product by a relatively simple procedure, that is, applying electrical stress to the non-volatile resistive memory.

The circuitry may change the physically unclonable function regularly or irregularly, and transmits information to an external server, the information obtained on a basis of the physically unclonable function that has been changed.

With this configuration, it is possible to achieve high defensive power against unknown future attack which analyzes the PUF itself, and thus the reliability of forgery detection of an image is further improved.

The circuitry may include first and second conversion tables for the physically unclonable function. The circuitry may change the physically unclonable function by updating the second conversion table but not updating the first conversion table. The circuitry may perform a logical operation between the first conversion table and the updated second conversion table. The image forgery protection apparatus may further include a transmission circuit that transmits a result of the logical operation to an external server. The circuitry may generate digest data obtained from data of the unique response and the subject image data. The circuitry may change the subject image data by adding the digest data to the subject image data.

Hereinafter, an embodiment of an image forgery detection system will be described with reference to the drawings. It is to be noted that components labeled with the same symbol perform similar operations in the embodiment, and thus repeated description may be omitted.

First Embodiment

FIG. 1 is a diagram schematically illustrating the entire configuration of a system according to a first embodiment. The image forgery detection system (an example of the image forgery protection apparatus) 1 illustrated in FIG. 1 adds specific information to an image, the specific information being based on data which is unique to each apparatus and physically not possible to be copied. In short, specific information based on the data having physical characteristic of being difficult to be copied is added to image data. Thus, a recorded image uniquely associated with each apparatus is created, and copying and tampering can be prevented. The image forgery detection system 1 includes an image sensor 101, a challenge data generator 102, and a unique response generator 103.

The image sensor 101 captures an image of a subject. The subject refers to anything such as a person, an object, scenery, which is a target for imaging by the image sensor of the present system. For instance, the subject is a person, scenery, an object, which is a target to be monitored by a monitoring camera. The place where a monitoring camera is installed may be outdoors or indoors. For instance, the place may be a cabin of a vehicle.

The image sensor 101 is a device that converts an optical image of a subject into an electrical signal, and is, for instance, a CCD image sensor or a CMOS image sensor.

Specific information is added to a subject image by modulation of an imaging parameter, the subject image being captured by the image sensor 101. The image sensor 101 can adjust the captured subject image by changing a predetermined imaging parameter. The image sensor 101 generates an imaging parameter after receiving a response (hereinafter may be called response data) from the unique response generator 103. The image sensor 101 adjusts, for instance, light exposure and white balance of a CCD according to a response. The image sensor 101 is an example of a specific information adder 100 that changes a subject image correspondingly to the unique response, the subject image being obtained by capturing an image of a subject.

The challenge data generator 102 generates challenge data that changes with lapse of time at least in a predetermined period.

The challenge data may be any data that changes with lapse of time. For instance, the challenge data may be generated using information (hereinafter, referred to as first information) that changes with lapse of time, such as time information, position information, and random number values. Alternatively, the challenge data may be generated by combining the above-mentioned first information and identification information (hereinafter, referred to as second information) such as individual product information, user specific information, and position information on product installation.

The time information may be in the present system or may be obtained externally of the system. For instance, the time information may be obtained from radio signals such as radio waves transmitted from a base station or an artificial satellite. As the position information, information from a GPS satellite may be obtained or information from a mobile phone base station may be utilized. As the individual product information, for instance, a vehicle identification number (VIN) may be used.

The first information and the second information as the base of the challenge data may be added as it is to a blanking period of a video signal or partial image data of a video. A verifying person (hereinafter, may also be referred to as a tampering verifier) who determines whether or not tampering is present derives response data from pre-registered response information using the first information and the second information added to the video signal, compares the derived response data with the response data included in the video signal, and verifies presence/absence of tampering.

The unique response generator 103 generates a unique response that changes with lapse of time, the unique response corresponding to the challenge data based on a physically unclonable function.

The physically unclonable function (PUF) is a function that is defined based on a manufacturing variation of a physical structure. In PUF technique, the response data generated with challenge data fixed is unique individual identification information which differs from one individual device to another. In other words, unique individual identification information which differs from one individual device to another can be generated utilizing the manufacturing variation.

Hereinafter, in the present description, when the challenge data inputted to the unique response generator 103 is pre-designated fixed challenge data, the response data to the challenge data is to be individual identification information and is called "PUF ID data". The pre-designated fixed challenge data is, for instance, information included in the second information. It may be safely said that the PUF ID data is random number data specific to each device, related to the variation in physical characteristic of each individual. Since it is not possible to artificially control the physical characteristic of each individual device, individual identification information which is not possible to be physically copied can be generated. The PUF ID data may be added to a video signal separately from the first information and the second information.

On the other hand, when the first the information is used as the challenge data, the challenge data changes over time. The pre-registered response information is a conversion model of PUF or data table information for conversion of PUF included in the unique response generator 103. Such pre-registered response information is referred to as PUF registration information in the present description. The PUF registration information is registered to a data server or the like. A tampering verifier obtains the PUF registration information via a network and conducts verification.

The challenge data generator 102 may adopt any configuration, and may be a general-purpose computer including a central processing unit (CPU) or a micro processing unit (MPU) and a memory, or may be a dedicated hardware. When the challenge data generator 102 is implemented by a general purpose computer, execution of processing is performed by software, and programs are recorded on a recording media such as a read only memory (ROM). The dedicated hardware is configured as a wired logic, and is implemented by an application specific integrated circuit (ASIC) or a field programmable gate array (FPGA), for instance.

The physically unclonable function may be, for instance, the initial value of a static random access memory (SRAM) when the power supply of the SRAM is turned on. Each of memory cells included in the SRAM is formed of a cross-coupled inverter circuit. This physical reproduction difficult function originates from a manufacturing variation of a threshold voltage of each transistor included in a pair of inverters. In this case, each of memory cells at the time of power supply on converges to the state of either 0 or 1 due to a variation of the memory cell itself. Thus, each of the memory cells in the SRAM may converge to an initial value that differs from one memory cell from another. A memory cell is allocated for each address in the SRAM, and thus address information can be used as the challenge data.

The unique response generator 103 selects an address in the SRAM in accordance with the first information and the second information, and outputs, as a response, a state value of 0 or 1 to which a memory cell corresponding to the selected address has converged. Such relationship between the challenge data and the response is unique to each SRAM, and the variation in the threshold value of the transistor may not be artificially controlled. Therefore, a function which is extremely difficult to be copied can be generated.

In addition, as the physically unclonable function, a physically unclonable function using a variation in the throughput of a wire and/or a logic circuit can be exemplified. A start signal with a rising edge changing from 0 to 1 is inputted to one input terminal, and the start signal is inputted to a path A and a path B. Multiple path selection circuits are provided at some points of the path A and the path B. Each of the path selection circuits can select connection between a preceding stage and a subsequent stage of the path selection circuit by using a selection signal. Specifically, each path selection circuit can select (1) connection is made from the paths A and B in the preceding stage to the paths A and B in the subsequent stage, respectively or (2) cross connection is made from the path A in the preceding stage to the path B in the subsequent stage, and the path B in the preceding stage to the path A in the subsequent stage. The final stage of the path A and the path B is provided with a determiner that measures an arrival time of the start signal. When the arrival time of the start signal outputted from the final stage of the path A is earlier than the arrival time of the start signal outputted from the final stage of the path B, the determiner outputs 1. When the arrival time of the start signal outputted from the final stage of the path A is later than the arrival time of the start signal outputted from the final stage of the path B, the determiner outputs 0.

Such scheme of physically unclonable function is called an arbiter scheme. In the arbiter scheme, the selection signal serves as challenge data and the response serves as a determination result of the determiner. In this manner, the arbiter scheme uses the variation in wire delay or the variation in the throughput of the selection circuit. These manufacturing variations are also extremely difficult to artificially control for each individual, and thus each can serve as a physically unclonable function.

In addition, as the physically unclonable function, a physically unclonable function based on the variation in the resistance value of the resistance variable elements in a non-volatile resistive memory can be exemplified. The resistance value of a resistance variable element included in a non-volatile resistive memory can make transition between a high resistance state (HR state) and a low resistance state (LR state) by applying electrical stress to the resistance variable element. The non-volatile resistive memory assigns two values of digital information respectively to these two states, and stores data. The resistance value of a resistance variable element can be changed. A physically unclonable function in a non-volatile resistive memory uses the variation in the resistance value of a group of memory cells which are set to either one of HR state and LR state.

The variation in each resistance state is based on the number of multiple conductive filament paths present in the resistance variable element and on the variation in the path route. The conductive filament maintains the same state while electrical stress greater than or equal to a predetermined value is not applied to the conductive filament. However, when electrical stress greater than or equal to the predetermined is applied to the conductive filament, the number and paths of conductive filaments are changed at random, and the resistance variation distribution relationship is updated. Thus, the physically unclonable function in the non-volatile resistive memory is updated.

The characteristic of the physically unclonable function in the non-volatile resistive memory is not present in the physically unclonable function of the SRAM or the arbiter scheme. With this characteristic, for instance, in recycling of a product, the physically unclonable function which has been used until then can be changed to a completely different one. Also, it is possible to construct a system in which for a product once used, the physically unclonable function which has been used for tampering detection until then may be deleted and discarded safely. A physically unclonable function using a non-volatile resistive memory will be described in detail later.

It is to be noted that the unique response generator 103 may adopt any configuration, and may have a configuration in which a general-purpose computer including a CPU or MPU and a memory, and the physically unclonable function are combined, or may be a dedicated hardware. When the challenge data generator 102 is implemented by a general purpose computer, execution of processing is performed by software, and programs are recorded on a recording media such as a ROM. The dedicated hardware is configured as a wired logic, and is implemented by an ASIC or FPGA, for instance.

Basic Operation of System

Figure 2:
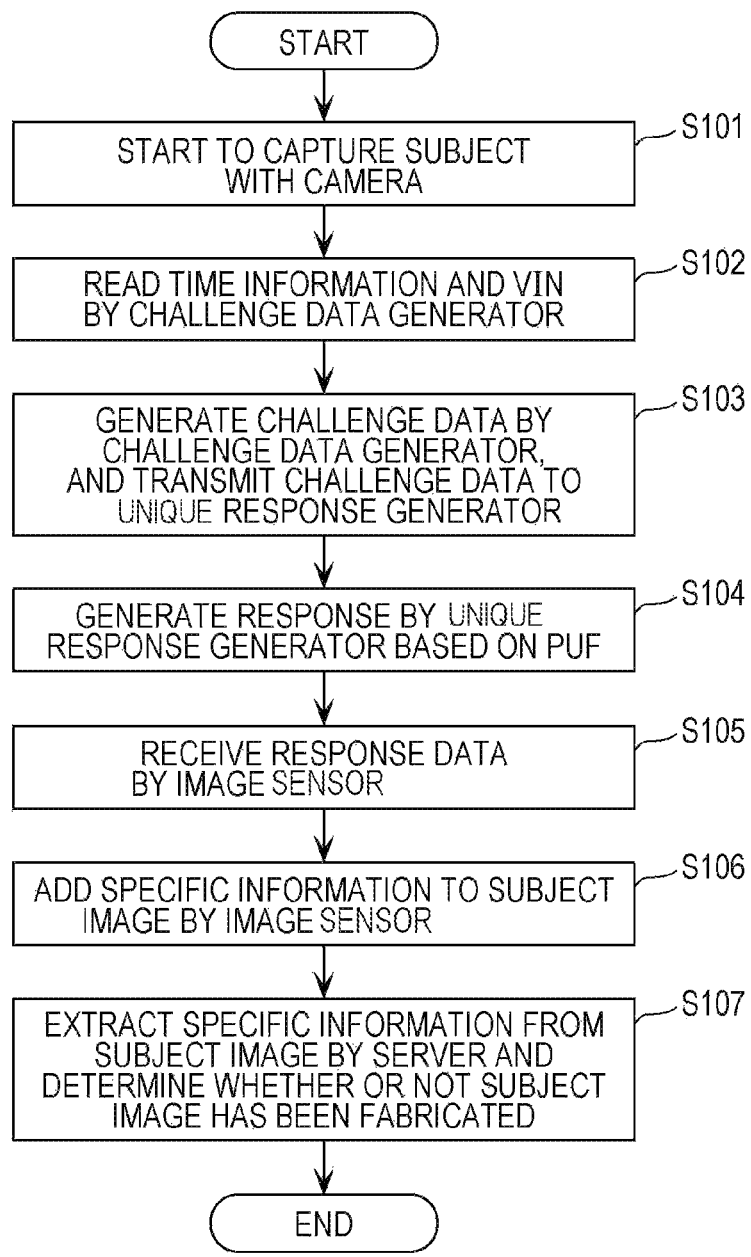
FIG. 2 is a flowchart illustrating the operation of the image forgery detection system according to the first embodiment.

Next, an example of the operation of the image forgery detection system 1 will be described using FIG. 1 and the flowchart of FIG. 2.

First, a camera including the image sensor 101 starts to capture an image of a subject (S101). The challenge data generator 102 reads time information and a vehicle identification number (VIN) (S102), generates challenge data based on both information, and transmits the challenge data to the unique response generator 103 (S103). The unique response generator 103 generates response data corresponding to the challenge data based on a physically unclonable function (PUF) (S104). The generated response data is inputted to the image sensor 101 (S105). The image sensor 101 modulates an imaging parameter correspondingly to the response data, thereby adding specific information to a subject image obtained by capturing an image of a subject (S106).

The subject image to which the specific information has been added is transmitted to an external server (not illustrated) via an electronic control unit (ECU) or the like. The server extracts the added specific information (encoded information) from image data, and determines presence/absence of forgery (S107). When it is determined that the data is correct, the processing of forgery detection is completed. Accordingly, imaging by the camera may be stopped. When it is determined that the data has been forged, the image forgery detection system 2 may give a warning at the location where the camera is installed or may report the forgery to the owner of the subject or a predetermined organization.

It is to be noted that the time information used by a verifier for determination may be sent from a device to the verifier separately via a radio circuit or a network, or a time display is actually captured and may be included in an image. In addition, the time information may be included in a blank period of a video signal or may be added to a video signal by a character generator. These modifications are also applied to the subsequent embodiments.

As described above, in this embodiment, specific information is added to an image by the modulation of an imaging parameter of the image sensor 101, and as the imaging parameter is changed, an image including a subject captured by the image sensor 101 is changed. The change in the image and the change in the response correspond to each other in a predetermined period.

With the above-described configuration, specific information based on data which is unique to each device and physically not possible to be copied is added to an image. Thus, a recorded image uniquely associated with each device can be created, and thus copying and tampering can be prevented.

Although an example has been described in which as the imaging parameter is changed, the image including a subject is changed in associated with a change in the response, the image forgery detection system of the present disclosure is not limited to this. It is sufficient that a change in the response and a change in the image including a subject captured by the image sensor correspond to each other in a predetermined period. Here, a change in the image indicates a state in which specific information is added to an image by a certain modulation associated with unique response data for challenge data. A certain modulation may be any modulation as long as the modulation is associated with unique response data. For instance, information on color, brightness out of image information is modulated. Also, the image information itself does not need to be modulated. For instance, voice information recorded concurrently with an image may be modulated. In this case, the specific information is added by slightly modulating the voice, or added to an ultrasonic range. Alternatively, the specific information may be added to a signal in a blanking period when an image is displayed in a predetermined system.

Second Embodiment

Figure 3:
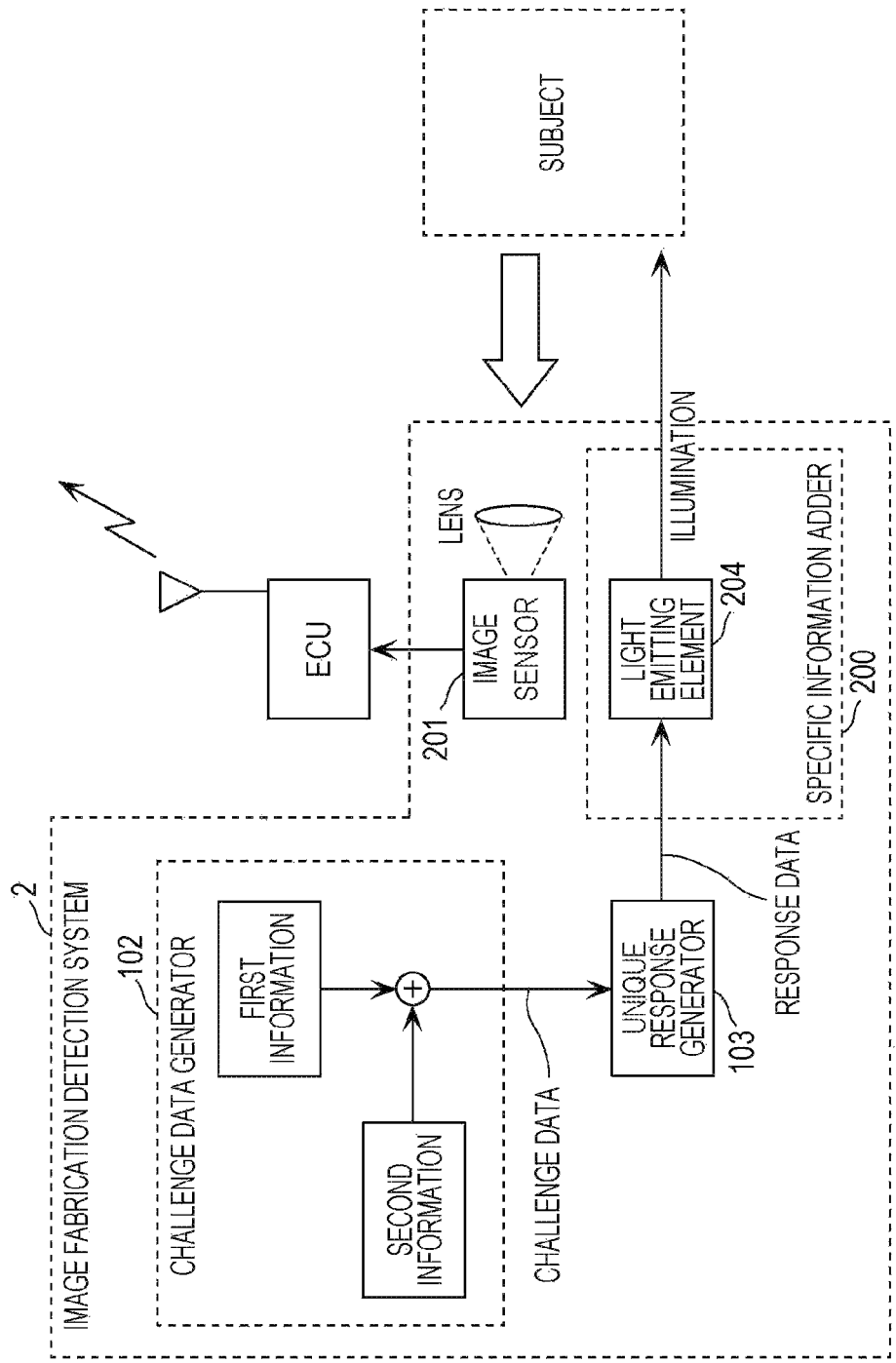
FIG. 3 is a diagram illustrating the entire configuration of an image forgery detection system according to a second embodiment.

FIG. 3 is a diagram schematically illustrating the entire configuration of a system according to a second embodiment.

In the first embodiment, specific information is added to an image by modulating the imaging parameter of the image sensor 101 with the response data generated by the unique response generator 103. An image forgery detection system 2 of this embodiment differs from the image forgery detection system of the first embodiment in that specific information is added to an image by changing the light emission pattern of a light emitting element 204 with the response data.

The image forgery detection system (an example of the image forgery protection apparatus) 2 illustrated in FIG. 3 adds specific information to an image, the specific information being based on data which is unique to each apparatus and physically not possible to be copied. In short, specific information based on the data having physical characteristic of being difficult to be copied is added to image data. Thus, a recorded image uniquely associated with each apparatus is created, and copying and tampering are prevented. The image forgery detection system 2 includes an image sensor 201, the challenge data generator 102, the unique response generator 103, and a light emitting element 204.

The light emitting element 204 generates a light emission pattern corresponding to a predetermined input. More specifically, when response data generated by the unique response generator 103 is inputted, a specific light emission pattern is generated based on the response data. The light emitting element 204 illuminates a subject by the generated light emission pattern. The light emitting element 204 is an example of a specific information adder 200 that changes a subject image correspondingly to the unique response, the subject image being obtained by capturing an image of a subject.

The light emitting element 204 is a device that converts an electrical signal to an optical signal, and for instance, is a semiconductor laser (LD) or a light emitting diode (LED).

The image sensor 201 captures an image of a subject illuminated by a specific light emission pattern, thereby obtaining a subject image to which specific information has been added.

Basic Operation of System

Figure 4:
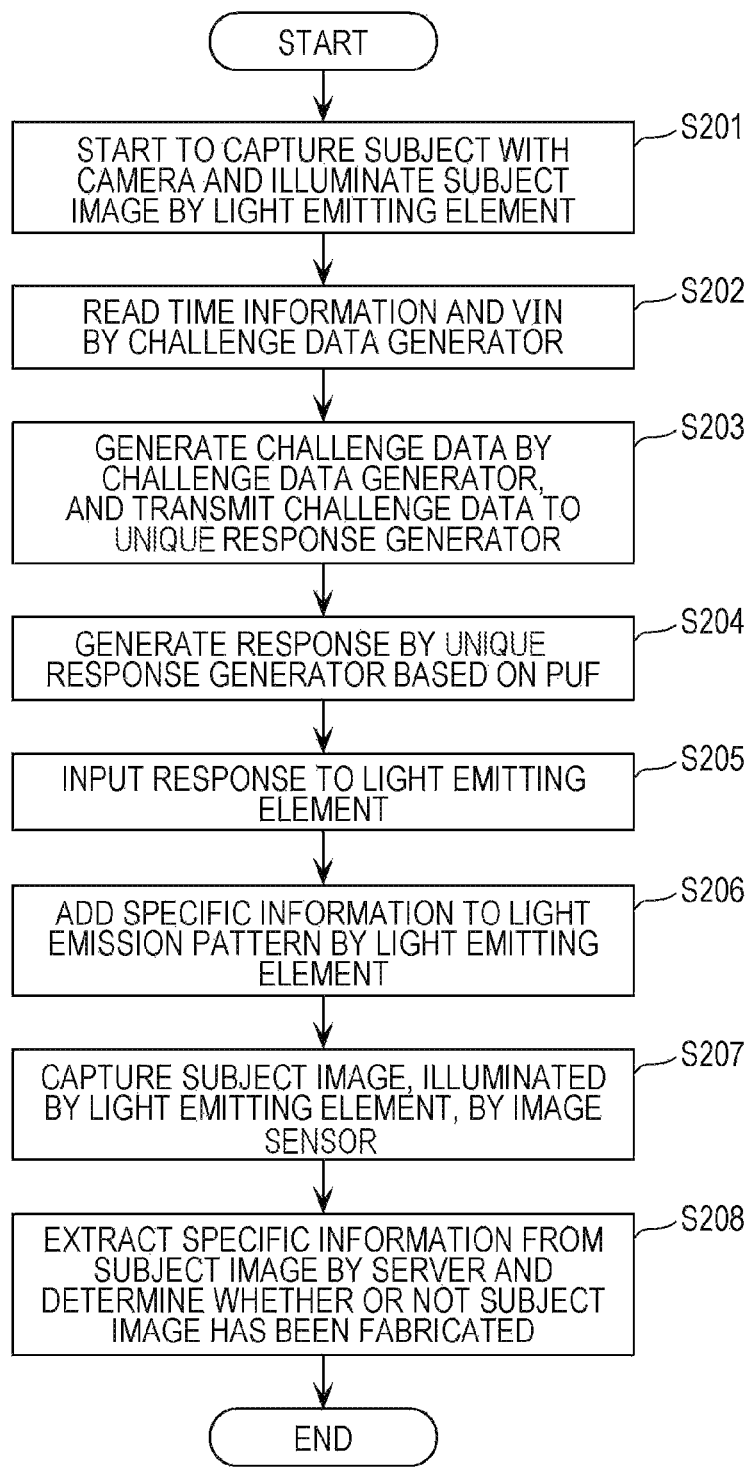
FIG. 4 is a flowchart illustrating the operation of the image forgery detection system according to the second embodiment.

Next, an example of the operation of the image forgery detection system 2 will be described using FIG. 3 and the flowchart of FIG. 4.

First, a camera including the image sensor 201 starts to capture an image of a subject, and the light emitting element 204 starts to illuminate the subject (S201). The challenge data generator 102 reads time information and a vehicle identification number (VIN) (S202), generates challenge data based on both information, and transmits the challenge data to the unique response generator 103 (S203). The unique response generator 103 generates response data correspondingly to the challenge data based on a physically unclonable function (PUF) (S204). The generated response data is inputted to the light emitting element 204 (S205). The light emitting element 204 generates a specific light emission pattern correspondingly to a response, and adds specific information to the light emission pattern for illuminating the subject (S206). The image sensor 201 captures the image of the subject which is illuminated by the light emitting element 204. Thus, the image sensor 201 obtains a subject image to which the specific information has been added (S207).

The subject image to which the specific information has been added is transmitted to an external server (not illustrated) via an ECU or the like. The server extracts the added specific information (encoded information) from image data, and determines presence/absence of forgery (S208). When it is determined that the data is correct, the processing of forgery detection is completed. Accordingly, the camera may stop imaging and the light emitting element may stop light emission. When it is determined that the data has been forged, the image forgery detection system 2 may give a warning at the location where the camera is installed or may report the forgery to the owner of the subject or a predetermined organization.

As described above, in this embodiment, specific information is added to an image by changing the light emission pattern of the light emitting element 204. As the light emission pattern is changed, an image including a subject captured by the image sensor 201 is changed. The change in the image and the change in the response correspond to each other in a predetermined period.

With the above-described configuration, specific information based on data which is unique to each apparatus and physically not possible to be copied is added to an image. Thus, a recorded image uniquely associated with each apparatus can be created, and thus copying and tampering can be prevented. It is to be noted that the light emitted by the light emitting element 204 may be visible light or may be light with a frequency which is not perceivable by human eyes.

Although it is assumed that the change in the light emission pattern is the change in the light quantity (that is, change in the luminosity), the present disclosure is not limited to this. The change in the quantity may be at a level perceivable by human eyes or may be tiny or quick change at a level not perceivable by human eyes. The light emission pattern may be changed in the manner of flicker communication with visible light.

Third Embodiment

Figure 5:
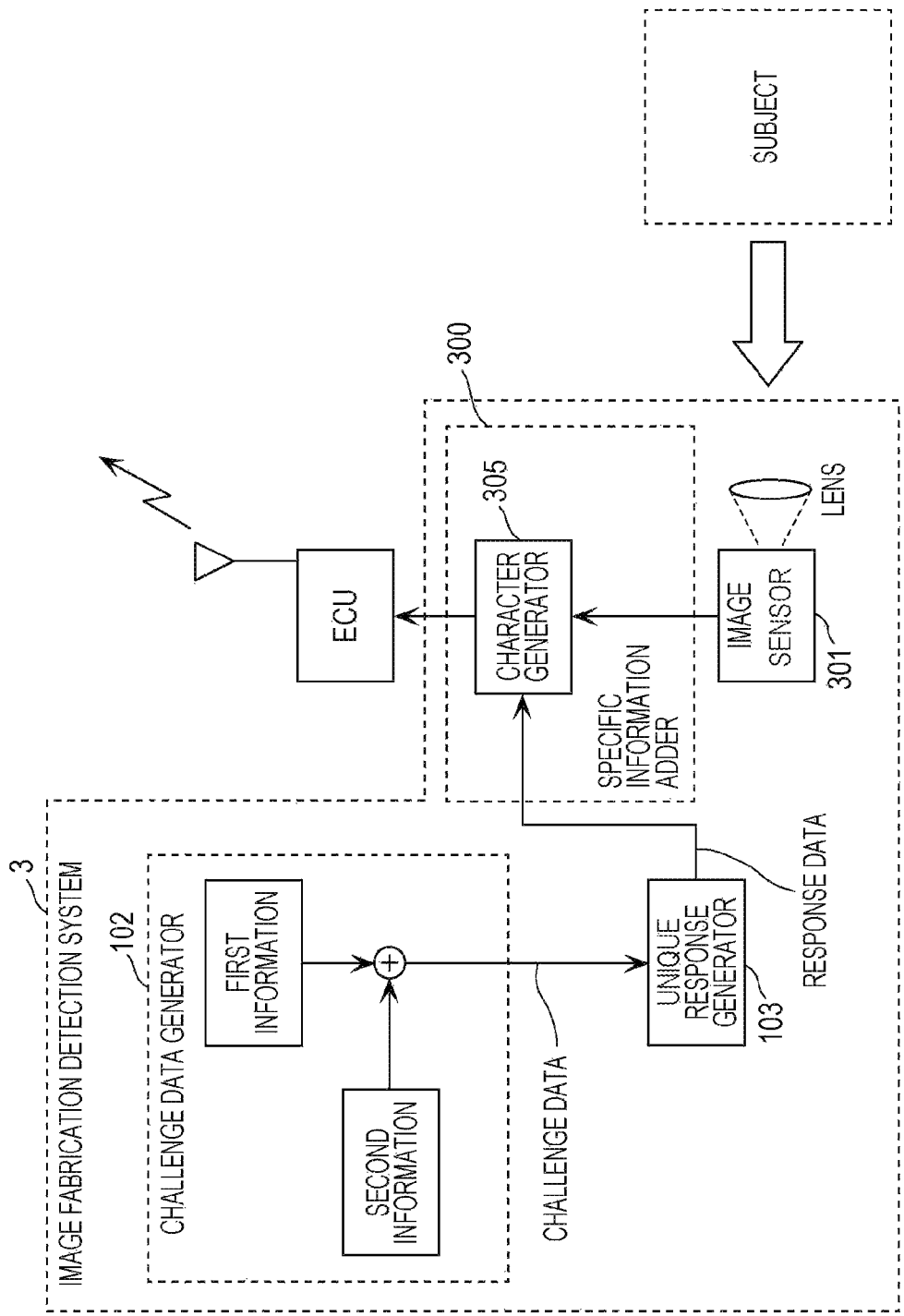
FIG. 5 is a diagram illustrating the entire configuration of an image forgery detection system according to a third embodiment.

FIG. 5 is a diagram schematically illustrating the entire configuration of a system according to a third embodiment.

In the first embodiment, specific information is added to an image by modulating the imaging parameter of the image sensor 101 with the response data generated by the unique response generator 103. The image forgery detection system 3 in this embodiment differs from the image forgery detection system of the first embodiment in that specific information is added to an image by changing a character generated by a character generator 305 with the response data.

The image forgery detection system (an example of the image forgery protection apparatus) 3 illustrated in FIG. 5 adds specific information to an image, the specific information being based on data which is unique to each apparatus and physically not possible to be copied. In short, specific information based on the data having physical characteristic of being difficult to be copied is added to image data. Thus, the system creates a recorded image uniquely associated with each apparatus, and protects against copying and tampering. The image forgery detection system 3 includes an image sensor 301, the challenge data generator 102, the unique response generator 103, and a character generator 305.

The character generator 305 generates a character corresponding to a predetermined input. More specifically, when the response data generated by the unique response generator 103 is inputted, a specific character is generated based on the response data. The character generator 305 adds the character to a subject image captured by the image sensor 301. Thus, the subject image to which the specific information has been added is obtained. The character generator 305 is an example of a specific information adder 300 that changes a subject image correspondingly to the unique response, the subject image being obtained by capturing an image of a subject.

Here, characters such as ASCII on a partial area of an image may be simply replaced or a character may be replaced by a character code such as a two-dimensional bar code. However, the present disclosure is not limited to this. In general, a technique of replacing part of an image with not an image actually captured but with image mapping information artificially generated is called a character generator function, and there are various techniques. Thus, detailed technical description is omitted.

The character generator 305 may adopt any configuration, and may be a general-purpose micro controller unit (MPU) including a CPU or MPU and a memory, or may be a dedicated hardware. When the challenge data generator 102 is implemented by a general purpose MPU, execution of processing is performed by software, and programs are recorded on a recording media such as a ROM or a non-volatile memory. The dedicated hardware is configured as a wired logic, and is implemented by an ASIC or FPGA, for instance.

Basic Operation of System

Figure 6:
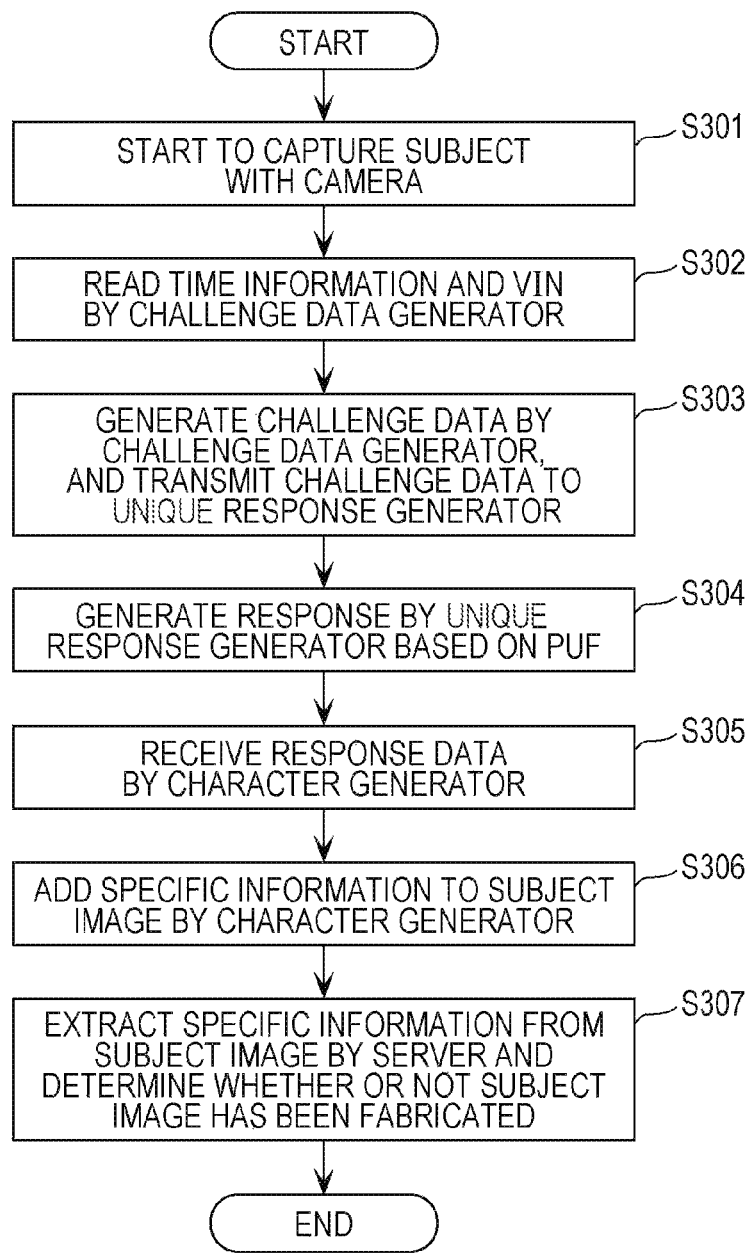
FIG. 6 is a flowchart illustrating the operation of the image forgery detection system according to the third embodiment.

Next, an example of the operation of the image forgery detection system 3 will be described using FIG. 5 and the flowchart of FIG. 6.

First, a camera including the image sensor 301 starts to capture an image of a subject (S301). The challenge data generator 102 reads time information and a vehicle identification number (VIN) (S302), generates challenge data based on both information, and transmits the challenge data to the unique response generator 103 (S303). The unique response generator 103 generates response data corresponding to the challenge data based on a physically unclonable function (PUF) (S304). The generated response data is inputted to the character generator 305 (S305). The character generator 305 generates a specific character corresponding to a response, and adds specific information to a subject image sent from the image sensor 301 (S306).

The subject image to which the specific information has been added is transmitted to an external server (not illustrated) via an ECU or the like, and the server extracts the added specific information (that is encoded information) from image data, and determines presence/absence of forgery (S307). When it is determined that the data is correct, the processing of forgery detection is completed. Accordingly, the camera may stop imaging and the light emitting element may stop light emission. When it is determined that the data has been forged, the image forgery detection system 3 may give a warning at the location where the camera is installed or may report the forgery to the owner of the subject or a predetermined organization.

As described above, in this embodiment, specific information is added to an image by changing the character generated by the character generator 305. As the character is changed, an image including a subject captured by the image sensor 301 is changed. The change in the image and the change in the response correspond to each other in a predetermined period.

With the above-described configuration, specific information based on data which is unique to each apparatus and physically not possible to be copied is added to an image. Thus, a recorded image uniquely associated with each apparatus can be created, and thus copying and tampering can be prevented.

In the first to third embodiments, specific information is added to an image by changing the imaging parameter of the image sensor 101, the light emission pattern of the light emitting element 204, and the character generated by the character generator 305 with the response data generated by the unique response generator 103. However, the present disclosure is not limited to these examples. The techniques disclosed in the first to third embodiments may be combined, and techniques of adding specific information may be used together.

In the first to third embodiments, a case has been exemplified in which the information on which the challenge data is based is the time information and the vehicle identification number. However, as already described, the information on which the challenge data is based may be replaced by one of or a combination of some of all pieces of data presented as an example of the first information and the second information. An example has been illustrated in which a captured image is transferred to an external server via a network. However, a captured image may be archived by a tape or a non-volatile memory. The archived image may be used to prove that an image has not been falsified when the image is separately browsed. In addition, for instance, the archived image may be utilized as evidence of a crime scene like a video shot by a monitoring camera.

Modifications

Figure 7:
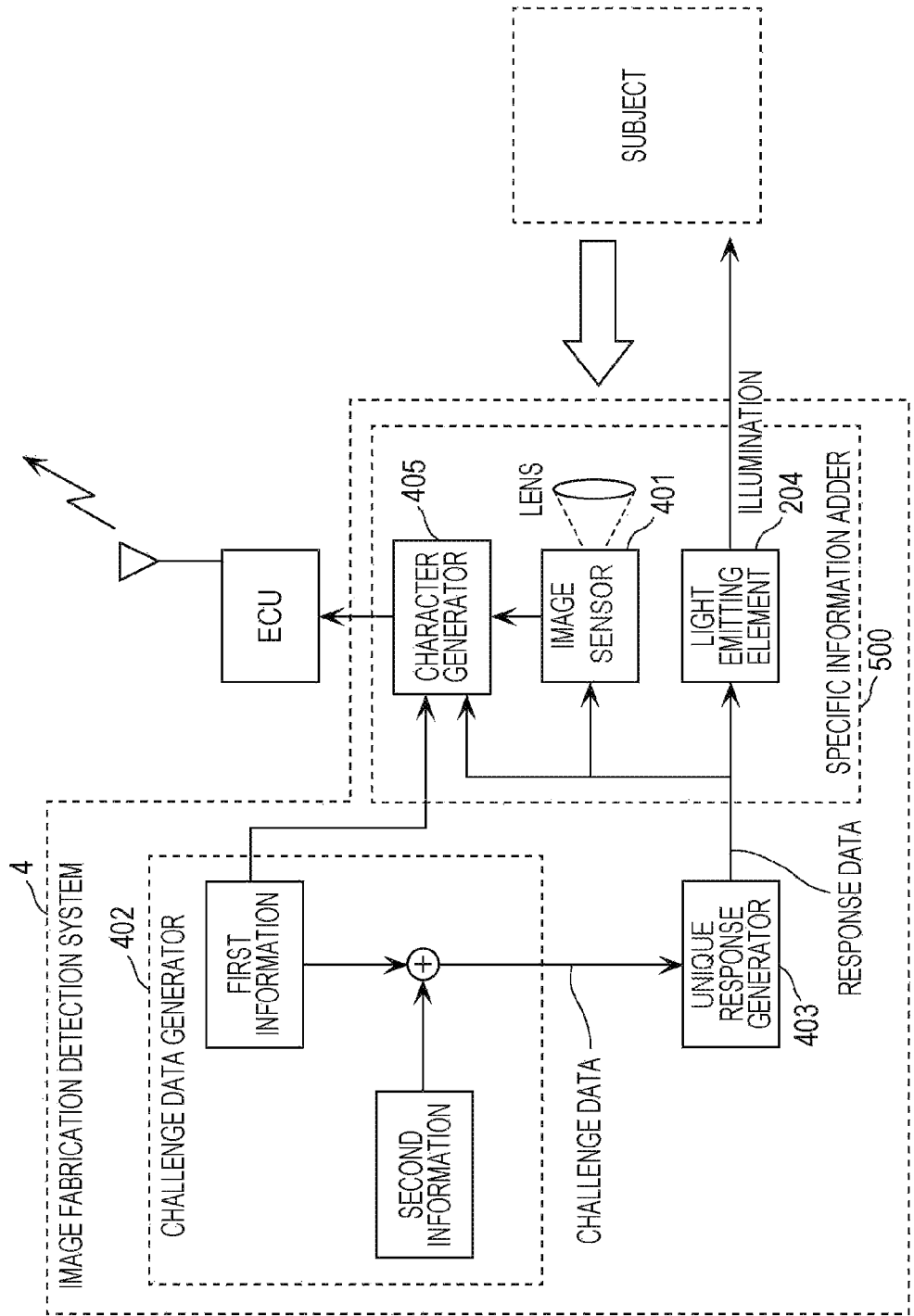
FIG. 7 is a diagram illustrating the entire configuration of an image forgery detection system according to a modification of an embodiment.

FIG. 7 is a diagram illustrating the entire configuration of an image forgery detection system according to a modification of an embodiment. An image forgery detection system 4 includes an image sensor 401, a challenge data generator 402, a unique response generator 403, the light emitting element 204, and a character generator 405.

The image forgery detection system (an example of the image forgery protection apparatus) 4 adds specific information to an image, the specific information being based on data which is unique to each apparatus and physically not possible to be copied. In short, specific information based on the data having physical characteristic of being difficult to be copied is added to image data. Thus, the system creates a recorded image uniquely associated with each apparatus, and protects against copying and tampering.

The challenge data generation unit 402 generates challenge data, and transmits the challenge data to the unique response generator 403, and transmits the first information (for instance, time information) to the character generator 405.

The unique response generator 403 generates response data corresponding to challenge data, and transmits the response data to each or part of the light emitting element 204, the image sensor 401, and the character generator 405. A component, to which response data is inputted to add specific information to a subject image, is selected as needed.

For instance, when response data is inputted to the image sensor 401, specific information is added to a subject image by the steps similar to S101 to S106 in the first embodiment.

For instance, when response data is inputted to the light emitting element 204, specific information is added to a subject image by the steps similar to S201 to S207 in the second embodiment.

For instance, when response data is inputted to the character generator 405, specific information is added to a subject image by the steps similar to S301 to S306 in the third embodiment.

In the image forgery detection system 4, specific information can be added to a subject image using two or more components out of the light emitting element 204, the image sensor 401, and the character generator 405.

As the next step, the subject image to which the specific information has been added is transmitted from the image sensor 401 to the character generator 405. The character generator 405 further adds the time information received from the challenge data generator 402 to the subject image, and transmits the subject image to a server via an ECU or the like.

With this configuration, the reliability of forgery determination is further improved by adding unique information based on a PUF and absolute time information to the subject image. In the image forgery detection system 4, the light emitting element 204, the image sensor 401, and the character generator 405 are included in the specific information adder 500.

It is to be noted that the operations of the system described in the first to third embodiments and the modifications are examples, and not limited to the details described above. For instance, although the challenge data generator 102 merges the time information as the first information with the vehicle identification number as the second information, and generates challenge data, information other than those above may be used as the first information and the second information. Also, the challenge data generator 102 may also generate challenge data using the first information only or the second information only. The number of pieces of information to be combined for generating challenge data by the challenge data generator 102 may be two or greater.

Also, a series of operations for image forgery detection are executed in a predetermined period, and do not have to be executed continuously at all times. It is desirable that a series of operations for image forgery detection be intermittently/periodically executed repeatedly to enhance the security performance.

Also, an one-way hash function circuit (not illustrated) may be disposed between the unique response generators 103, 403 and the image sensors 101, 401, the light emitting element 204 or the character generators 305, 405. In this configuration, response data generated by the unique response generators 103, 403 is inputted to the image sensors 101, 401, the light emitting element 204 or the character generators 305, 405 via the hash function circuit. A hash function to be used preferably satisfies the hash function standard SHA. Disposition of a hash function circuit allows tampering detection to be more reliably performed during data communication, and thus the reliability of authentication is improved.

Exemplification of PUF Using Non-volatile Resistive Memory

Figure 8:
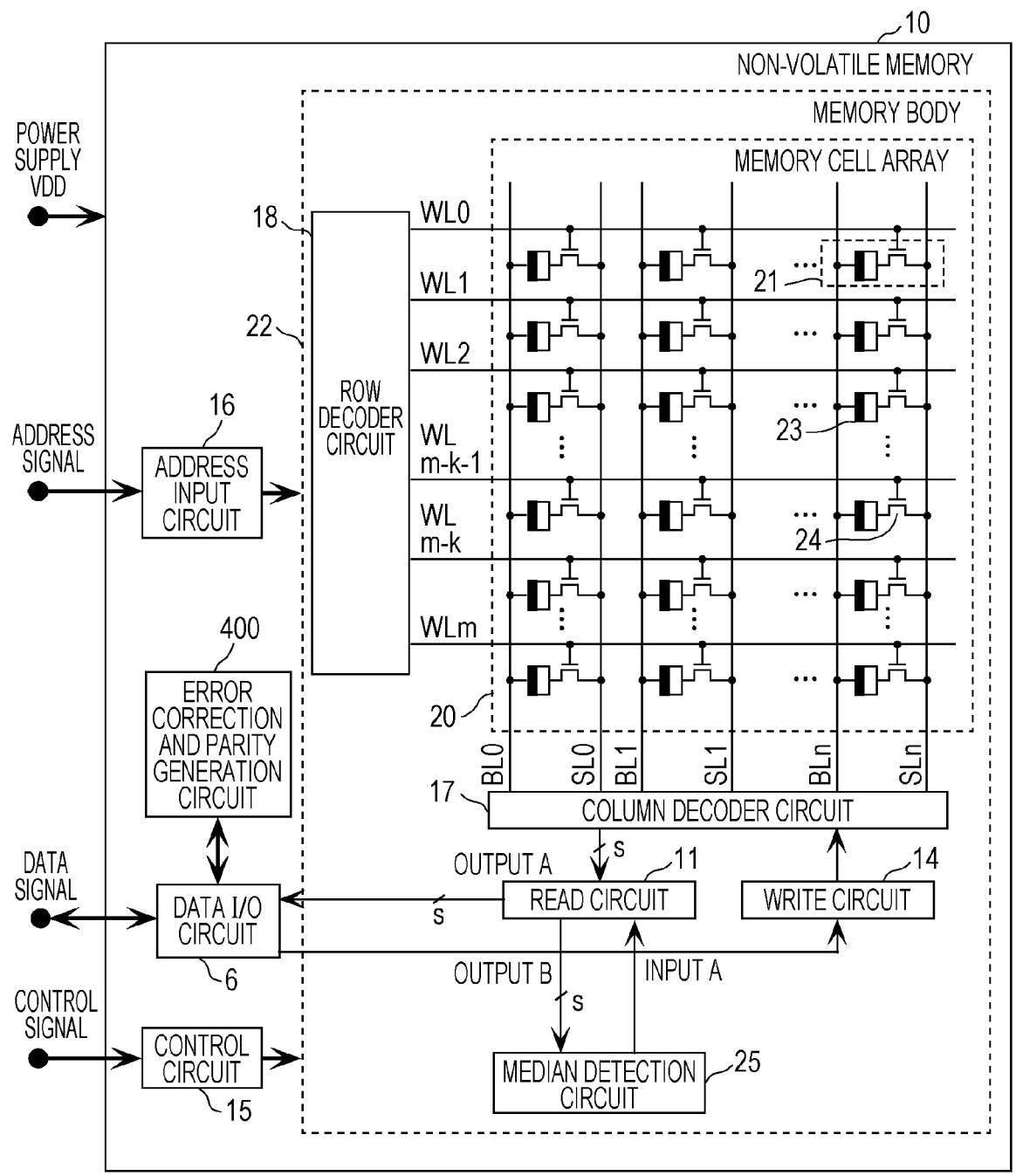
FIG. 8 is a block diagram illustrating a specific configuration example of a non-volatile resistive memory in the present disclosure.

Here, PUF using a non-volatile resistive memory will be described. FIG. 8 is a block diagram illustrating a specific configuration example of a non-volatile resistive memory in the present disclosure. It is to be noted that FIG. 8 is only an example, and the specific configuration of a non-volatile resistive memory including a physically unclonable function in this embodiment is not limited to the configuration illustrated in FIG. 8.

As illustrated in FIG. 8, a non-volatile memory 10 in this embodiment includes a memory body 22 on a semiconductor substrate. In addition, the non-volatile memory 10 includes a data input/output circuit 6, a control circuit 15, an address input circuit 16, and an error correction and parity generation circuit 400.

The memory body 22 includes a read circuit 11, a write circuit 14, a column decoder circuit 17, a row decoder circuit 18, a memory cell array 20, and a median detection circuit 25. The write circuit 14 applies a predetermined voltage in each operation to a selected memory cell 21, and writes a resistance state according to data to be stored.

The read circuit 11 reads a change in a current which flows through a bit line, as digital data taking one of multiple values greater than two values. The digital data is resistance information data that indicates information having a correlation with a resistance value. In a typical storage device, when original data is read from a resistance state which has been written according to the data stored, it is sufficient that a read circuit be provided, that determines one of two values according to a magnitude relationship between a predetermined threshold value and a resistance value. In contrast, when a physically unclonable function is generated from the variation in resistance values as in this embodiment, highly accurate resistance information is necessary.

The read circuit 11 is usable for normal data reading. In this case, the read circuit 11 determines the resistance information data to be one of two values using a predetermined threshold value, and restores the original 0/1 data. In general, a resistance value is defined by a current value in relation to an applied voltage. However, the resistance information data is not limited to this. For instance, an electric charge charged in a capacitor is discharged via a selected memory cell, a detected voltage decreases accordingly, and information on a time until the voltage decreases to a predetermined level or lower may be used as the resistance information data.

The row decoder circuit 18 selects one word line WL from a plurality of m+1 word lines WL connected to the memory cell array 20.

The column decoder circuit 17 selects s bit lines BL and corresponding s source lines SL (s is the number of parallel read operations) from a plurality of n+1 bit lines BL and a plurality of n+1 source lines SL, and connects the selected lines to the write circuit 14 and the read circuit 11.

These operations may be performed according to the number of rows and/or columns in which reading and/or writing are performed concurrently.

The read circuit 11 of the non-volatile memory 10 has an output terminal A and an output terminal B, and an input terminal A. The read circuit 11 receives a threshold value via the input terminal A. The threshold value is used for binarizing a signal obtained from the column decoder circuit 17 to data of 0 or 1 by the read circuit 11.

In addition, the read circuit 11 outputs a signal obtained from the column decoder circuit 17 to the median detection circuit 25 via the output terminal B. The signal is utilized by the median detection circuit 25 for calculating a median needed to generate response data (hereinafter referred to as PUF response data) of a physically unclonable function (PUF).

In addition, the read circuit 11 outputs, via the output terminal A, data of 0 or 1 which is user data, and data of 0 or 1 which is PUF response data. A threshold value utilized for generating user data may be different from a threshold value utilized for generating PUF response data. A threshold value different from input A utilized for generating user data is inputted (not illustrated) from the control circuit.

Here, the generation of a physically unclonable function using the variation in the resistance values of resistance variable elements will be described.

Figure 9A:
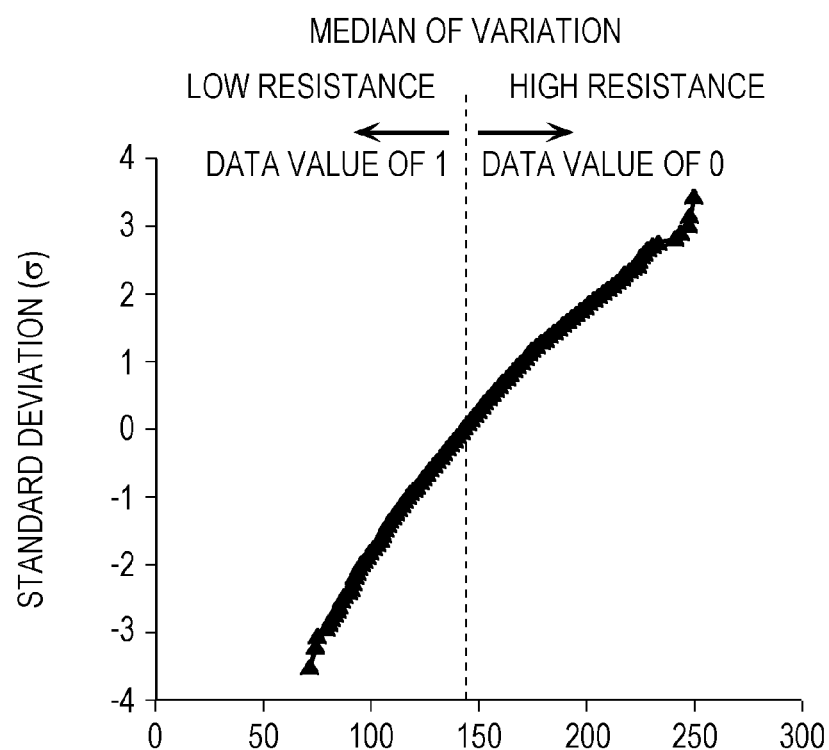
FIG. 9A is an explanatory diagram illustrating a variation in the resistance of resistance variable elements.

FIG. 9A is an explanatory diagram illustrating a variation in the resistance of resistance variable elements. In the graph of FIG. 9A, the horizontal axis represents a standardized value of resistance information having a correlation with resistance value. The vertical axis represents a standard deviation that indicates a variation distribution of resistance value. The following has been already explained: the resistance state of a resistance variable element includes HR state and LR state. The resistance states have a variation for each resistance variable element. The graph of FIG. 9A illustrates a variation distribution of the resistance value of a resistance variable element (memory cell) in LR state. Like this, it is illustrated that the distribution of standard deviation in relation to the resistance information can be plotted along substantially a straight line, and follows an ideal normal distribution. As illustrated in FIG. 9A, when the resistance information is divided into binary data of 0 and 1 at the median (the point where the standard deviation is zero) of the variation distribution, data with extremely high randomness is obtained. The median is calculated by the median detection circuit 25 of FIG. 8, and is inputted to the read circuit 11 as a threshold value via the input terminal A.

Such data according to each address of the memory array constitutes conversion table information for deriving PUF response data.

Figure 9B:
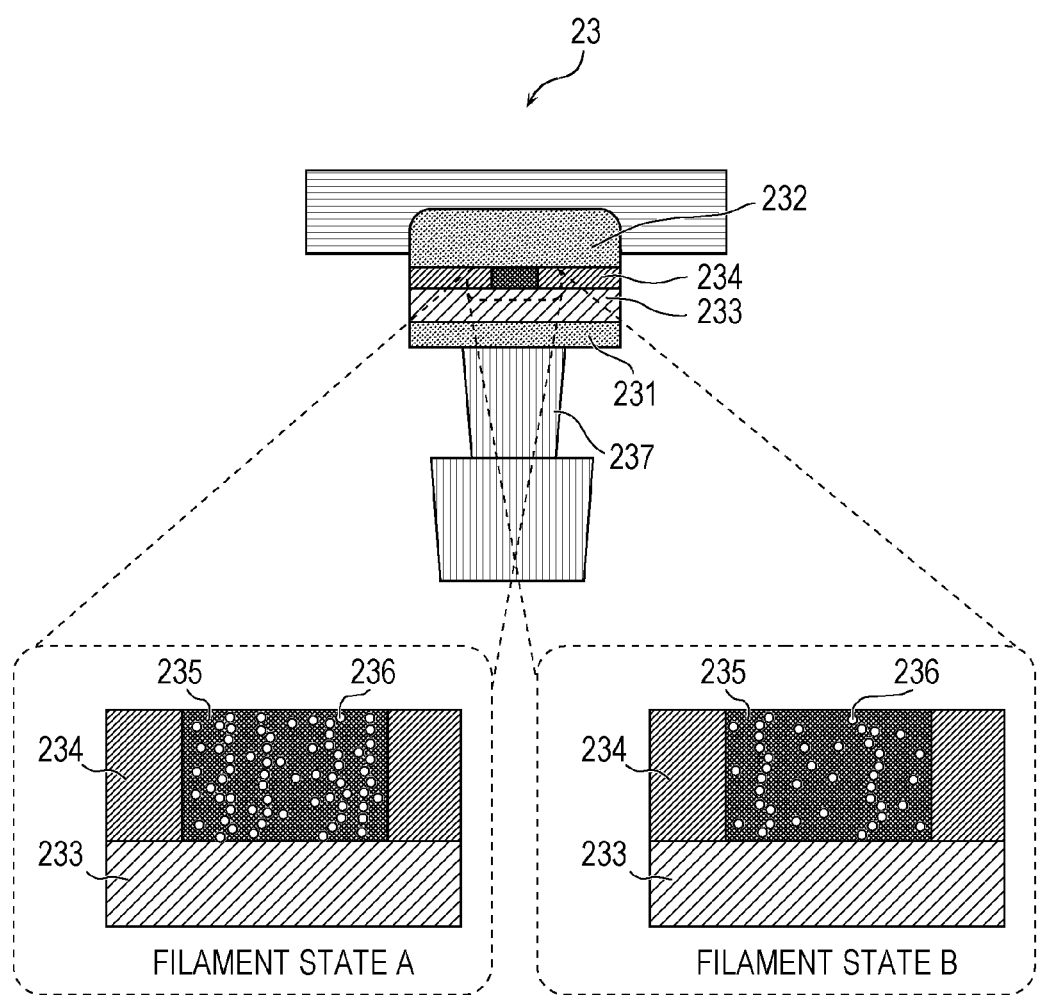
FIG. 9B is an explanatory diagram illustrating the mechanism of resistance change of a resistance variable element.

FIG. 9B is an explanatory diagram illustrating the mechanism of resistance change of a resistance variable element 23. In FIG. 9B, the resistance variable element 23 has a configuration in which a variable resistance layer 233 and a high resistance layer 234 are located between a first electrode 231 and a second electrode 232. The variable resistance layer 233 may be composed of, for instance, a metal oxide, more specifically, a transition metal oxide. The first electrode 231 is connected to a transistor (not illustrated) via a connection plug 237 to form a memory cell.

The resistance variable element 23 of the memory cell in a variable state has characteristics such that application of an electrical signal between the first electrode 231 and the second electrode 232 causes the resistance value therebetween to change reversibly in multiple variable resistance ranges.

The high resistance layer 234 of the resistance variable element 23 of the memory cell in an initial state immediately after manufacturing is in an insulated state. The high resistance layer 234 is in a state where an oxidation degree is higher than in the variable resistance layer 233. Specifically, the insulated state may achieve 2 MΩ or higher. The initial resistance range may be adjusted to some extent with the material, size, shape, and manufacturing conditions of the resistance variable element 23. For instance, particularly when the variable resistance layer 233 has a stacked layer structure, the initial resistance range is adjustable in any manner by the thickness of a layer with a high oxygen concentration and the oxygen concentration at the time of formation. However, the initial resistance range is not adjustable for each individual memory cell. The resistance variable element 23 in the initial state also has a variation for each element, and PUF response data is also obtainable from a memory cell group in the state.

Application of a predetermined electrical stress to the resistance variable element 23 in the initial state allows transition to a variable state in which the resistance value is changeable between HR state and LR state. Such an electrical stress is called a forming stress. Once the resistance variable element 23 has a variable state, the resistance variable element 23 never resume the initial state, and an electrical signal lower than the forming stress causes reversible change between HR state and LR state. When the resistance value of the resistance variable element 23 is read, a voltage lower than both an electrical signal changed in a variable resistance range and the forming stress is applied to the resistance variable element 23 and the resistance value is read.

When the forming stress is applied, an oxygen deficiency occurrence area 235 indicated by dark gray color occurs in part of the high resistance layer 234 in FIG. 9B. The oxygen deficiency occurrence area 235 is a variable resistance area where application of an electrical signal causes an oxygen deficiency 236 to occur or disappear. The amount and distribution of occurrence of the oxygen deficiency 236 change at random for each rewriting.

The memory cells with a low resistance value out of memory cells in LR state are in a state where the density of the oxygen deficiency 236 is high and many filament paths are connected as in the filament state A. On the other hand, the memory cells with a high resistance value out of memory cells in LR state are in a state where the density of the oxygen deficiency 236 is low and less filament paths are connected as in the filament state B. Since the amount and distribution of the oxygen deficiency 236 change at random for each rewriting, a memory cell in the filament state A may change to the state B, or reversely a memory cell in the filament state B may change to the state A, which exhibits transition uncontrollable by human. Use of the characteristics allows the physically unclonable function to be updated. The write circuit 14 rewrites the memory cells and updates the physically unclonable function.

The variable resistance layer 233 and the high resistance layer 234 may be composed of a metal oxide. The variable resistance layer 233 and the high resistance layer 234 may further include a layer composed of an oxygen-deficient metal oxide. The metal oxide of which the variable resistance layer 233 and the high resistance layer 234 are composed may be at least one of transition metal oxide and aluminum oxide. Alternatively, the metal oxide of which the variable resistance layer 233 and the high resistance layer 234 are composed may be at least one of tantalum oxide, iron oxide, hafnium oxide and zirconium oxide. Alternatively, as the metal oxide of which the variable resistance layer 233 and the high resistance layer 234 are composed, titanium (Ti) oxide, nickel (Ni) oxide, or iron (Fe) oxide may be used. As the material for the first electrode 231 and the second electrode 232, for instance, iridium (Ir), platinum (Pt), tungsten (N), copper (Cu), aluminum (Al), titanium nitride (TiN), tantalum nitride (TaN) and titanium aluminum nitride (TiAlN) may be used.

Hereinafter, an example of the operation of the median detection circuit 25 will be described.

The read circuit 11 compares the resistance information data with a threshold value inputted to the input terminal A, and outputs a median error signal 0 for equal, 1 for larger, −1 for smaller from the output terminal B. The median error signal from the output terminal B is outputted simultaneously for the number of channels (s) read concurrently. Thus, s median error signals are inputted to the median detection circuit 25. The median detection circuit 25 is a calculation circuit, and may be achieved using a semiconductor integrated circuit, for instance. The median detection circuit 25 reads a resistance median which is calculated through feedback control so as to reduce the median error signals, and outputs the resistance median to the input terminal A of the read circuit 11. The median of variation illustrated in FIG. 9A is calculated by appropriately performing the feedback control, and a threshold value for reading data of a conversion table for physically unclonable function is generated.

It is to be noted that a method of calculating a median is not limited to this example. For instance, although a necessary memory capacity is increased, a median may be calculated by a method in which multiple resistance values are stored by the median detection circuit and sorted.

Figure 10:
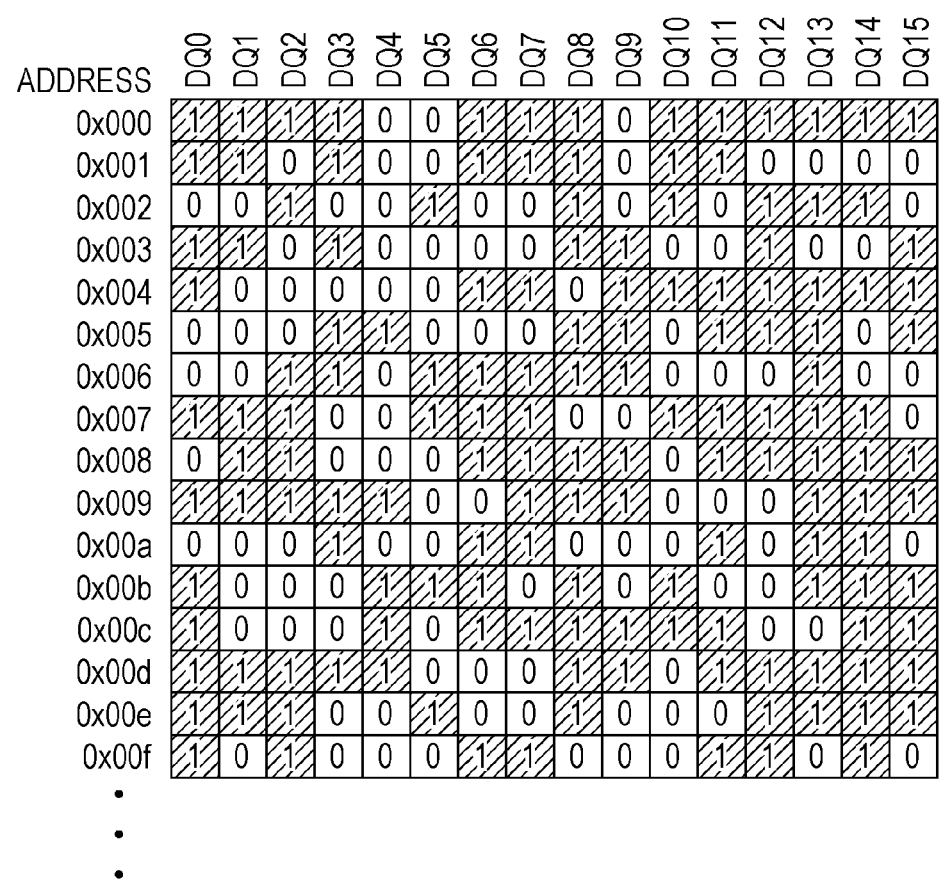

As described above, FIG. 10 is a schematic diagram in which the median of a distribution of variation in the resistance value is detected, and the resistance value of each of memory cells is converted to binary data of 0/1 using the median as a threshold. As described above, the number of bits readable concurrently is s bits, and FIG. 10 illustrates the case of 16 bits which are DQ0 to DQ15, respectively. It is seen that each address value is indicated in a vertical direction and random data for each address is outputted. In this manner, a conversion table for the physically unclonable function for the addresses is generated, and the conversion table is unique to each apparatus and not possible to be copied. In other words, an address value of FIG. 10 is received as challenge data, and DQ data according to the challenge data can be outputted as the PUF response data.

If the PUF response to be outputted externally of the apparatus is directly outputted, the table may be guessed. Thus it is desirable that the PUF response be converted by one-way function such as a hash function. It is to be noted that the conversion table data generated from the variation in the resistance value may include a data error. Thus, the error correction and parity generation circuit 400 of FIG. 8 is separately provided with parity data for error correction in order to have a function of maintaining the same table at all times by correcting a data error which has occurred in the conversion table data. Since an error correction technique is a publicly known technique, details are omitted.

As described above, a non-volatile resistive memory is used for a PUF used by the unique response generator 103, and thus not only a physically unclonable function which plays a key role for forgery protection is configurable, but also the physically unclonable function is updatable. Thus, in discarding and recycling of a apparatus, it is possible to avoid risk such as fraudulent use of a registered old physically unclonable function. Also, processing to change to a different physically unclonable function may be performed regularly or irregularly by applying a predetermined electrical stress. In this case, variation information newly obtained from a post-change physically unclonable function is registered to an external server, and the PUF is updated regularly. The variation information is an example of predetermined information based on the post-change physically unclonable function. With this configuration, it is possible to achieve high defensive power against unknown future attack which analyzes the PUF itself, and thus the reliability of forgery detection of an image is further improved.

The following has been already explained: an one-way hash function circuit (not illustrated) may be disposed between the unique response generators 103, 403 and the character generators 305, 405. However, the configuration using a hash function is not limited to this configuration. For instance, the character generator 305 described in FIG. 5 or the character generator 405 described in FIG. 7 may calculate a hash value from the image data obtained from the image sensor 301 or 401 and a series of data including the PUF response data. The hash value is digest data of the entire data including the PUF response data and the image data. Due to the characteristics of a hash function, even 1 bit change in the PUF response data and the image data causes a change in the hash value. In other words, when image data is falsified, tampering is easily detectable by using a hash function.

FIG. 11 illustrates an image diagram of processing and transmission data. Image data may be either uncompressed data or compressed data. The unique response generator 103 or 403 obtains response data from challenge data by using a physically unclonable function. The character generator 305 or 405 calculates a hash value from the response data and the image data. Thus, the transmission data transmitted by the ECU is the total of the challenge data, the image data, and the hash value. The receiving side, when receiving the transmission data, extracts the challenge data from the data, and calls pre-registered response information (hereinafter may be called database) according to the extracted challenge data. The receiving side further calculates a hash value from the response data in the database and the image data. The receiving side can detect tampering by determining whether or not the hash value in the transmission data matches the hash value calculated by the receiving side.

It is to be noted that the digest data may be generated using a message authentication code (MAC). The MAC includes a cipher-based message authentication code (CMAC) that generates digest of data using an encryption circuit. The method of MAC is not limited as long as one-way function is applicable.

In ReRAM, as illustrated in FIG. 10, the following has been explained: a conversion table for a physically unclonable function for the addresses is generated. That is, in ReRAM, the addresses as in FIG. 10 and PUF data according to the addresses are treated as raw PUF data, that is vital data for which the highest level of security has to be ensured in the PUF of ReRAM. The raw PUF data as in FIG. 10 is registered to a data server or the like at a manufacturing location where the security is ensured, and after the registration, the raw PUF data is not read from the server. Thus, the vital raw PUF data is prevented from being leaked to the outside. However, it is extremely difficult to ensure complete concealment in a security operation where many people are involved, and there is a risk of leakage of vital data at all times.

As described above, a physically unclonable function using ReRAM has the characteristic that the physically unclonable function is updatable. The database of raw PUF can be updated by taking advantage of the characteristic. In a general method, a physically unclonable function is not updated in principle. Since a physically unclonable function which is registered at a manufacturing location at the time of shipment of a apparatus is not updated, when the database is leaked, the security is not ensured. In the image forgery protection apparatus using ReRAM in the present disclosure, measures can be taken to reduce the above-described risk on the security by updating and re-registering the physically unclonable function on a field after shipment.

As illustrated in FIG. 12, the conversion tables for physically unclonable functions as illustrated in FIG. 10 are provided for at least two areas on ReRAM. As illustrated in FIG. 12, let PUF1 and PUF2 be the conversion tables for physically unclonable functions for these two areas. It is assumed that PUF1 and PUF2 are read at a manufacturing location at the time of shipment of the apparatus, and are registered to the database. After the shipment, due to restrictions on a circuit, only the data of exclusive OR between PUF1 and PUF2 for each bit can be read. Hereinafter, the exclusive OR data between PUF1 and PUF2 is denoted by EXOR (PUF1, PUF2). Both PUF1 and PUF2 are random number values specific to the apparatus, and it is difficult to guess PUF1 and PUF2 from the exclusive OR between two random number values.

On a field after the shipment, the physically unclonable function of PUF1 is not changed and equal to the value registered to the database at the time of shipment. However, for PUF2, the physically unclonable function is updated by the above-described method in accordance with the characteristic of ReRAM. As illustrated in FIG. 12, EXOR (PUF1, PUF2) is transmitted to the database server via the ECU. The database server can calculate the data of PUF2 from the pre-registered PUF1, and thus the content of update of PUF2 is identifiable. Thus, the database server can update the data of PUF2 on the database. For instance, when an image data transmission apparatus is installed on a field, when a power supply is turned on for the first time on the field, restrictions are imposed on a circuit so as to allow such an update procedure only once. Thus, an opportunity of reading EXOR (PUF1, PUF2) is limited, and the security can be further improved.

It is to be noted that encryption communication is performed for a communication path for reading from ReRAM, registration from an ECU to the database server, and the security may be further improved. For encryption of communication paths, various schemes are available in well-known techniques, and thus details are omitted.

The embodiments and modifications described above may be implemented by computer hardware and computer programs executed on the computer hardware.

In the embodiments and modifications, the processes or functions may be implemented by centralized processing performed by a single apparatus or decentralized processing performed by multiple apparatus. For instance, an image sensor may be mounted as an image sensor of a camera for a drive recorder, and a light emitting element may be mounted as a headlight of a vehicle to allow cooperation between the apparatus. With this configuration, authentication as the drive recorder can be proved with higher reliability, and thus the present disclosure is applicable to an insurance service.

The present disclosure is not limited to the embodiments above and various modifications may be made to the embodiments. Needless to say, those modified embodiments are also included in the scope of the present disclosure.

The image forgery detection system according to the present disclosure provides the effects that an image forgery attack caused by leakage of secret information is protected, and a non-conventional safety camera monitoring system is provided, and thus the image forgery detection system is useful.

What is claimed is:

1. An image forgery protection apparatus comprising:
one or more memories; and circuitry which:
generates challenge data which change with lapse of time at least in a predetermined period;
generates a unique response which changes with lapse of time, the unique response corresponding to the challenge data on a basis of a physically unclonable function; and
changes subject image data correspondingly to the unique response, the subject image data obtained by capturing an image of a subject,
wherein the challenge data is generated by using at least one selected from the group consisting of current time, and position information on product installation, the current time and the position information being received from outside the image forgery protection apparatus,
the circuitry includes a light emitting element that illuminates the subject, and
the circuitry controls the light emitting element to change the subject image data correspondingly to the unique response by changing a light emission pattern of the light emitting element correspondingly to the unique response.

2. The image forgery protection apparatus according to claim 1,
wherein the circuitry includes an image sensor that captures the image of the subject to generate the subject image data, and that adjusts the subject image data by changing a predetermined imaging parameter, and
the circuitry changes the subject image data correspondingly to the unique response by changing the imaging parameter correspondingly to the unique response.

3. The image forgery protection apparatus according to claim 1,
wherein the circuitry generates a character and adds the character to the subject image data, and
the circuitry changes the subject image data correspondingly to the unique response by changing the character correspondingly to the unique response.

4. The image forgery protection apparatus according to claim 1,
wherein the challenge data is generated further by using at least one selected from a group consisting of individual product information, and user specific information.

5. The image forgery protection apparatus according to claim 1,
wherein the physically unclonable function is a function based on a resistance value of a resistance variable element included in a non-volatile resistive memory.

6. The image forgery protection apparatus according to claim 5,
wherein the circuitry changes the physically unclonable function by applying an electrical stress to the non-volatile resistive memory.

7. The image forgery protection apparatus according to claim 6, wherein the circuitry changes the physically unclonable function regularly or irregularly, and transmits information to an external server, the information obtained on a basis of the physically unclonable function that has been changed.

8. The image forgery protection apparatus according to claim 6,
wherein the circuitry includes first and second conversion tables for the physically unclonable function, and
the circuitry changes the physically unclonable function by updating the second conversion table but not updating the first conversion table.

9. The image forgery protection apparatus according to claim 8,
wherein the circuitry performs a logical operation between the first conversion table and the updated second conversion table, and
the image forgery protection apparatus further includes a transmission circuit that transmits a result of the logical operation to an external server.

10. The image forgery protection apparatus according to claim 1,
wherein the circuitry generates digest data obtained from data of the unique response and the subject image data, and
the circuitry changes the subject image data by adding the digest data to the subject image data.

* * * * *